US011184372B2

(12) United States Patent
Bergström

(10) Patent No.: US 11,184,372 B2
(45) Date of Patent: *Nov. 23, 2021

(54) DETECTION AND MITIGATION OF TIME-DELAY BASED NETWORK ATTACKS

(71) Applicant: Fortinet, Inc., Sunnyvale, CA (US)

(72) Inventor: J. Dennis Bergström, Stockholm (SE)

(73) Assignee: Fortinet, Inc., Sunnyvale, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 16/912,977

(22) Filed: Jun. 26, 2020

(65) Prior Publication Data
US 2020/0329060 A1    Oct. 15, 2020

Related U.S. Application Data

(63) Continuation of application No. 15/640,381, filed on Jun. 30, 2017, now Pat. No. 10,708,283.

(51) Int. Cl.
H04L 29/06 (2006.01)
G06F 21/53 (2013.01)
H04L 12/58 (2006.01)
H04L 29/08 (2006.01)
G06F 21/56 (2013.01)

(52) U.S. Cl.
CPC .......... H04L 63/1416 (2013.01); G06F 21/53 (2013.01); H04L 51/12 (2013.01); H04L 63/1441 (2013.01); H04L 63/1483 (2013.01); G06F 21/566 (2013.01); G06F 2221/2149 (2013.01); H04L 63/101 (2013.01);
(Continued)

(58) Field of Classification Search
CPC ............. H04L 63/1416; H04L 63/1483; H04L 63/1441; H04L 63/101; H04L 29/06; H04L 67/02; H04L 51/00; G06F 21/53; G06F 2221/2149
See application file for complete search history.

(56) References Cited

U.S. PATENT DOCUMENTS 9,876,753 B1 * 1/2018 Hawthorn ............... H04L 51/18
10,243,989 B1 * 3/2019 Ding ........................ H04L 51/08
(Continued)

OTHER PUBLICATIONS

Non-Final Office Action for U.S. Appl. No. 15/640,381, dated May 31, 2019, 22 pages.
(Continued)

Primary Examiner — Saleh Najjar
Assistant Examiner — Khalid M Almaghayreh

(57) ABSTRACT

Systems and methods are described for mitigation of time-delay based network attacks that seek to avoid detection by email security solutions employing sandboxing. According to one embodiment, a potentially malicious link associated with a communication is received from a computer system by a sandbox device. A link evasion technique, in which a first file to which the potentially malicious link points to at a first time is replaced with a second file on or before a second time, is subverted by the sandbox by evaluating the potentially malicious link at multiple times including generating a first hash value of the contents of the first file, generating a second hash value of the contents of the second file, assigning a threat level to the communication when the hash values differ, and informing the computer system of the threat level assigned to the communication.

19 Claims, 10 Drawing Sheets

(52) U.S. Cl.
CPC .............. *H04L 67/02* (2013.01); *H04L 67/06* (2013.01); *H04L 67/34* (2013.01)

(56) References Cited

U.S. PATENT DOCUMENTS

| | | | | |
|---|---|---|---|---|
| 2003/0041093 A1* | 2/2003 | Yamane | ................ | H04L 41/046 |
| | | | | 709/201 |
| 2013/0014261 A1* | 1/2013 | Millliken | .............. | H04L 63/145 |
| | | | | 726/24 |
| 2014/0123279 A1* | 5/2014 | Bishop | .................. | G06F 21/563 |
| | | | | 726/23 |
| 2014/0215614 A1* | 7/2014 | Beskrovny | ............ | G06F 21/577 |
| | | | | 726/23 |
| 2015/0007312 A1* | 1/2015 | Pidathala | .............. | H04L 63/145 |
| | | | | 726/22 |
| 2015/0161121 A1* | 6/2015 | Alvarez | .............. | G06F 16/2255 |
| | | | | 707/698 |
| 2015/0237068 A1* | 8/2015 | Sandke | ............... | H04L 63/1441 |
| | | | | 726/23 |
| 2015/0381653 A1* | 12/2015 | Starink | ................... | G06F 16/22 |
| | | | | 726/22 |
| 2016/0127399 A1* | 5/2016 | Starink | ................... | G06F 21/53 |
| | | | | 726/23 |
| 2016/0241575 A1* | 8/2016 | Ushida | .................... | H04L 51/18 |
| 2017/0195310 A1* | 7/2017 | Tyler | ..................... | G06F 21/554 |
| 2018/0191754 A1* | 7/2018 | Higbee | .................. | G06F 21/554 |
| 2018/0270258 A1* | 9/2018 | Sandke | ................. | G06F 21/566 |
| 2018/0343271 A1* | 11/2018 | Tenorio | ............... | H04L 63/1425 |

OTHER PUBLICATIONS

Final Office Action for U.S. Appl. No. 15/640,381, dated Dec. 12, 2019, 25 pages.
Notice of Allowability for U.S. Appl. No. 15/640,381, dated Mar. 31, 2020, 19 pages.

* cited by examiner

DETECTION AND MITIGATION OF TIME-DELAY BASED NETWORK ATTACKS

RELATED APPLICATIONS

This application is a continuation of U.S. patent application Ser. No. 15/640,381, filed on Jun. 30, 2017, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2017-2020, Fortinet, Inc.

BACKGROUND

Field

Embodiments of the present invention generally relate to network security. In particular, embodiments of the present invention relate to detection and mitigation of sandbox-evasive techniques that malware use to deceive mail-security solutions.

Description of the Related Art

Creators of malware (malicious, undesired and/or harmful files/data/software) are well aware of organizations deploying sandboxing-solutions for trying to detect malware in emails/messages/communications, and therefore are cognizant of the possibility of the emails/messages/communications being exposed to a sandbox environment where an attachment and/or link in the body of an electronic mail (email) will be thoroughly checked. Sandboxing typically refers to any suitable method of analyzing a Uniform Resource Locator (URL), domain, web site and/or file in a controlled and/or isolated environment, separate from an end-user computer, system, device, or environment in order to prevent any potential malicious threats from infecting the end user's environment. By observing behavior of the resource linked by a URL in a sandboxed environment, email threat protection systems learn about threats and can also declare URLs and entire normalized patterns (as discussed below) as being malicious, thereby reducing the time and effort required to stop the damage of malware distribution campaigns.

Deployment of an email to a sandbox queue usually happens quite near the time at which the email is received by the target mail-server, wherein time spent in the queue and in the sandbox environment itself depends at least on configuration of the sandbox and its utilization, but is typically on the order of less than 30 minutes (including queuing and sandbox run-time). Malware-authors try to test-drive malware through several vendor's security-devices as well as checking their own malware-deploying/dropping servers for inclusion in any Internet Protocol (IP)-reputation black-lists.

One technique of implementing a time-delay based network attack aims at deceiving a mail-security solution (e.g., one implemented by or on behalf of an enterprise email server) to allow an email/message containing a malware link to be passed through to a target victim without being flagged as malicious. Such an attack typically has multiple parts including a malware-deployment server that is not currently on an IP-reputation black-list, a good file (e.g., a file that is totally benign and will neither trigger any malware signatures nor any bad sandboxing-behavior), and a bad file (e.g., a file incorporating malware), wherein during implementation of the attack, a link is included within an email/message that points to the malware-deployment server and a file (referred to as "FILE" in this example), e.g., http://servername.com/FILE. The link is configured in a manner so as to initially point to the good file, and after a defined time interval (e.g., 30 to 45 minutes or so) the malware author replaces the good file with the bad file at the backend, thereby redirecting the link to the bad file (presumably, after sandboxing has been performed by the enterprise email server associated with the target of the attack). As the linking of http://servername.com/FILE was initially to the good file, no malware is detected by the sandbox environment thereby enabling the email message to be transmitted to the intended recipient—the target of the attack. However, subsequently, when the good file is replaced with the bad file at the backend after a time interval (selected to increase the likelihood that any sandboxing, if any, has already been performed on the good file) and the recipient clicks on the embedded link, he/she is made to access the bad file, thereby allowing execution of malware associated with the bad file on the recipient's computer system. For example, when the targeted user reads such an email/message from home (e.g., via his/her laptop), the malware will possibly download and be executed and then be carried into the organization's internal network.

There is therefore a need in the art for systems and methods that enable efficient detection and mitigation of such time-delay based network attacks.

SUMMARY

Systems and methods are described for mitigation of time-delay based network attacks that seek to avoid detection by email security solutions employing sandboxing. According to one embodiment, a potentially malicious link associated with a communication is received from a computer system by a sandbox device. A link evasion technique, in which a first file to which the potentially malicious link points to at a first time is replaced with a second file on or before a second time, is subverted by the sandbox by: (i) downloading the first file at the first time; (ii) assigning a first threat level to the communication indicative of a lack of a perceived threat based on one or more of evaluating a behavior of the first file in a sandbox environment provided by the sandbox device and comparing contents of the first file with malware signatures; (iii) generating a first hash value based on the contents of the first file; (iv) informing the computer system that the first threat level has been assigned to the communication; (v) downloading the second file at the second time; (vi) generating a second hash value based on the contents of the second file; (vii) assigning a second threat level to the communication indicative of the communication representing a risk based on the second hash value differing from the first hash value; and (viii) informing the computer system that the second threat level has been assigned to the communication.

Other features of embodiments of the present disclosure will be apparent from accompanying drawings and from detailed description that follows.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1A:
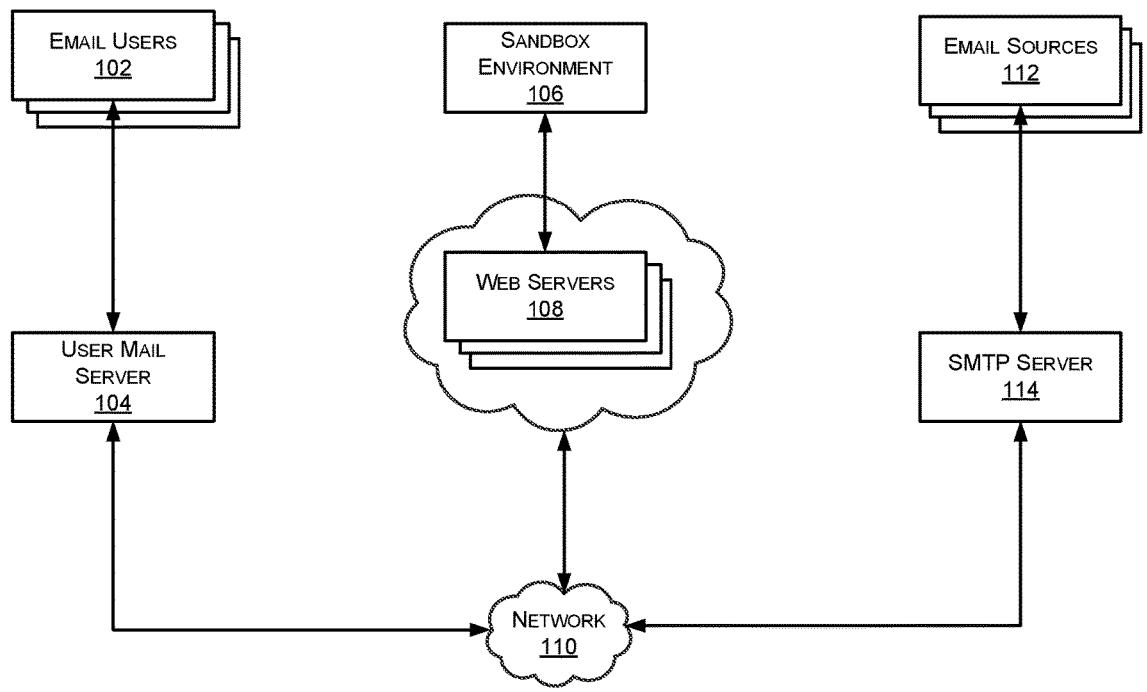
FIGS. 1A and 1B illustrate exemplary sandbox implementation architectures in which or with which embodiments of the present invention can be implemented.

Systems and methods are described for mitigation of time-delay based network attacks that seek to avoid detection by email security solutions employing sandboxing. Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

System and method of the present disclosure enable an email server to receive an email having a potentially malicious link and directed to a user, and, upon receipt, at a first time, cause a file to which the potentially malicious link points at the first time to be evaluated within a sandbox environment and a first hash value to be generated based on contents of the file. The email server is then, at a second time, configured to cause, a file to which the potentially malicious link points to, at the second time to be evaluated, and generate a second hash value based on contents of the file such that when the first and the second hash values differ, the email server treats the file to which the potentially malicious link points to at the second time as being malicious, or causes the file to be evaluated within the sandbox environment.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

If the specification states a component or feature "may", "can", "could", or "might" be included or have a characteristic, that particular component or feature is not required to be included or have the characteristic.

Systems and methods are described for mitigation of time-delay based network attacks that seek to avoid detection by email security solutions employing sandboxing.

In an aspect, the present disclosure relates to a method for detection and mitigation of sandbox-evasive techniques that malware use to deceive email-security solutions, wherein the method includes the steps of receiving, by an email server of an enterprise, an electronic mail (email) directed to a user of the enterprise and containing a potentially malicious link; and at a first time, causing, by the email server, a file to which the potentially malicious link points at the first time to be evaluated within a sandbox environment and a first hash value to be generated based on contents of the file to which the potentially malicious link points at the first time. The method can further include the steps of, at a second time, causing, by the email server, a file to which the potentially malicious link points to at the second time to be evaluated, including downloading the file to which the potentially malicious link points to at the second time and generating a second hash value based on contents of the file to which the potentially malicious link points to at the second time such that when the first hash value and the second hash value differ, the method can either enable treating, by the email server, the file to which the potentially malicious link points to at the second time as a suspicious or high risk file, or enable causing, by the email server, the file to which the potentially malicious link points to at the second time to be evaluated within the sandbox environment.

According to one embodiment, the sandbox environment can be provided by a sandbox device associated with the enterprise and coupled in communication with the email server.

In yet another aspect, when the email server enables the file to which the potentially malicious link points at the first time to be evaluated within a sandbox environment, and the evaluation results in the file being deemed not to be a threat by the sandbox device, the sandbox device can enable the email server to deliver the email to the user.

In an aspect, when the first hash value and the second hash value differ, the method can further include sharing, by the sandbox device, threat information that has been detected to be associated with the email with one or more other network security devices that provide network security protection on behalf of the enterprise. In another aspect, when the first hash value and the second hash value differ, the method can further include sending, by the email server, a warning email to the user regarding the email possibly linking to malware. In yet another aspect, when the first hash value and the second hash value differ, the method can further include sending, by the email server, a warning email to an administrator of the email server regarding the email possibly linking to malware.

In an aspect, when the email server performs an evaluation of the file to which the potentially malicious link points to at the second time, the email server can download the file to which the potentially malicious link points to at the second time, and generate a second hash value based on contents of the file to which the potentially malicious link points to at the second time. In an implementation, one or more of downloading of the file to which the potentially malicious link points to at the second time and generation of the second hash value can be performed by the sandbox device.

In another aspect, the sandbox device can periodically perform bulk download of file hash values that have been calculated by the sandbox device and such file hash values can be made accessible to the email server.

In an aspect, the second time (the time at which the file to which the potentially malicious link points is reevaluated) can be a predetermined or configurable amount of time after the first time (the time at which the file to which the potentially malicious link points was initially evaluated) and can be selected to subvert a link evasion technique in which the file to which the potentially malicious link points to at the first time is replaced with another file on or before the second time.

In another aspect, the first hash value and the second hash value can be produced by a cryptographic hash function.

Figure 1B:
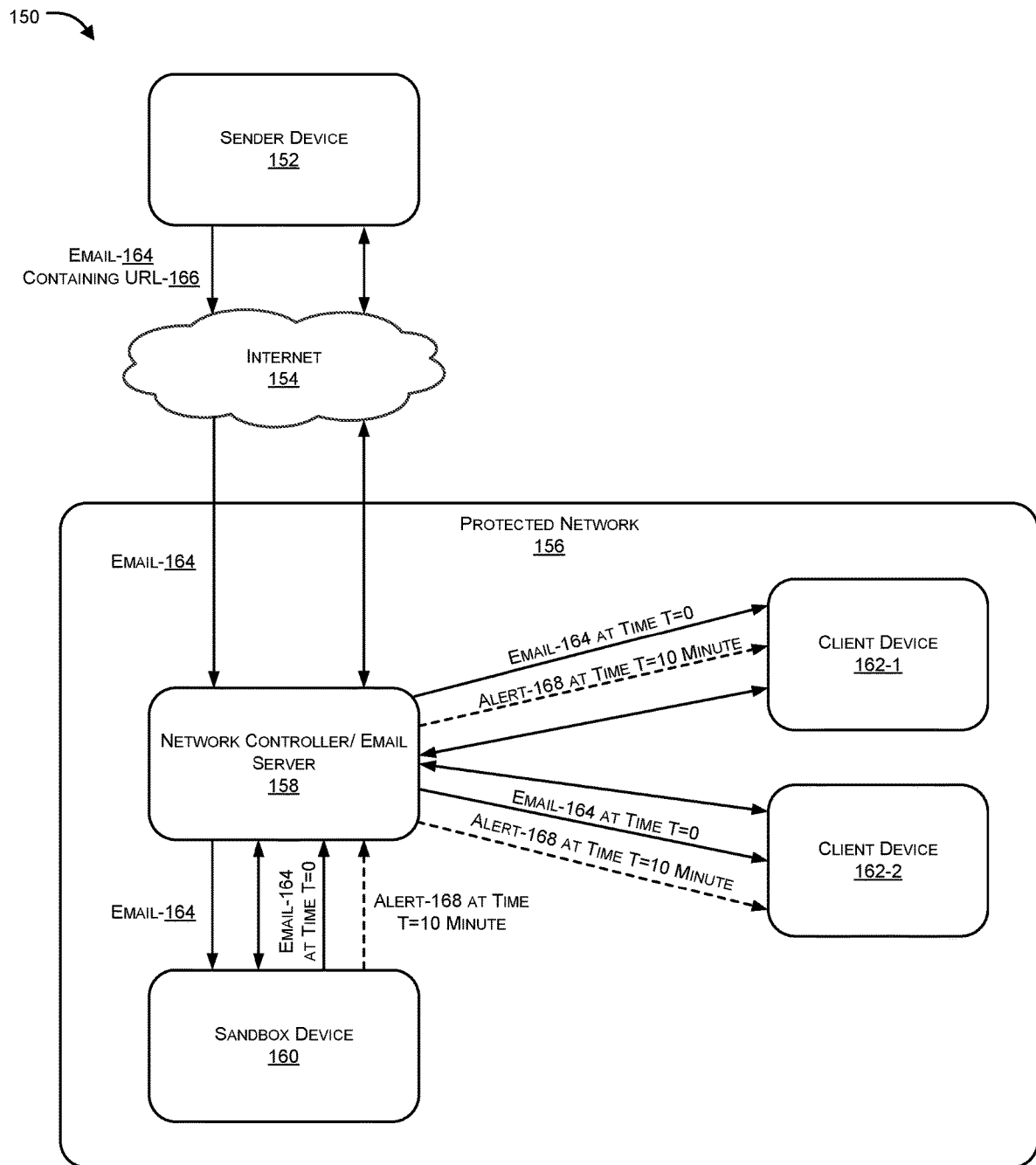

FIGS. 1A and 1B illustrate exemplary sandbox implementation architectures in which or with which embodiments of the present disclosure can be implemented. FIG. 1A illustrates an exemplary sandbox implementation architecture 100 for mitigation of time-delay based network attacks that seek to avoid detection by email security solutions employing sandboxing in accordance with an exemplary embodiment of the present disclosure.

In an aspect, as illustrated in FIG. 1A, an email source 112 (or many email sources) can be in operative communication with a mail server (which may also be referred to as email server hereinafter) for sending electronic mails (emails) that can be, as illustrated, a Simple Mail Transfer Protocol (SMTP) Server 114. In one or more exemplary embodiments, emails sent by source(s) 112 may contain Uniform Resource Locators (URLs) pointing to files that may reside on servers that are configured outside the control of system administrators of the enterprise with which the email servers are associated. Such files may be benign or may contain malware-related content that, if allowed to be downloaded and/or executed on the computing device of the e-mail recipient, can infect/affect the computing device and make the device as well as other devices it connects to and the whole network susceptible to various vulnerabilities, exploits, and virus/malware attacks, as is known in the art. The file that the URL points to may spread malware in several ways. For example, it can be a self-executable file that executes itself as soon as the recipient clicks on the URL, or can be a file disguised as a zip file or a Microsoft (MS) Word file that may have hidden macros that launch and execute when the file is opened by corresponding programs. Upon such execution, the file may launch one or more of different types of malware, e.g., Trojans, viruses and worms, resulting in harmful consequences well known in the art.

In another aspect, SMTP server 114 can in turn connect to a network 110 using means known in the art, wherein network 110 can include, but is not limited to, for example the Internet or any other network configured to allow the transmission of data, e.g. a Local Area Network (LAN), a Wide Area Network (WAN) or any computer network that includes one or more computing systems in communication with each other.

In yet another aspect, an email being sent by email source 112 can be addressed to email user 102 (and likewise, mails being sent by email source 112 can be addressed to email users 102), using email addressing techniques well known in the art. To receive emails addressed to them, email users 102 can be in operative communication with a mail server 104 that can be accessed through one or more existing or future protocols used for email transmission, including, but not limited to, the Internet Message Access Protocol (IMAP), Post Office Protocol version 3 (POP3), SMTP, Hyptertext Transfer Protocol (HTTP) and Exchange. Email users 102 and associated server 104 can belong to a protected network that the system of the present disclosure seeks to protect against various virus/malware attacks etc. Mail server 104 can also connect to network 110 using means known in the art.

In an aspect, the system of the present disclosure can include a sandbox environment 106 and/or one or more web servers 108, wherein web servers 108 can be on the same network 110 through which mail traffic is being sent between email sources 112 and email users 102, and can be configured in such a manner that any e-mail being received by network 110 that contains an embedded URL is not sent directly to email users 102 but instead is first passed on by web servers 106 to sandbox environment 106.

Sandbox environment 106 can be configured to evaluate a file to which a URL present in an e-mail links at one or more pre-determined time intervals, as elaborated further below. In an exemplary implementation, at time 0 (that is, as soon as sandbox 106 receives the e-mail), sandbox environment 106 can perform a first check of the file to which the URL links for any suspicious aspects, e.g., virus, malware etc., by passing the URL to web servers 108 that can download the file to which the URL points and sending the file to sandbox environment 106. Sandbox environment 106 can compute a hash value of the file and store the hash value in a database (that can be a temporary cache in sandbox environment 106, for example), and run/execute the file against stringent malware checks in its isolated (sandbox) environment to determine a threat level of the file by, for example, observing behavior of the file and/or comparing the attributes of the file with the latest virus/malware signatures etc. Sandbox environment 106 may also store in the database other identifying parameters of the file, e.g., its file type, header information, source and destination Internet Protocol (IP) addresses, content, and metadata, for example.

In another example, a URL received by email server can point to a website file (e.g., a login.html or an index.php of a website, for example) and, in a similar manner, sandbox environment 106 can check the website file for any malware infection and consequently determine its threat level, and at the same time, storing the metadata, hash value of the file content, or any other attribute of the website file/webpage in its database/repository/memory that may be integral or operatively coupled with sandbox 106. In an aspect, sandbox environment 106 can store all or a portion of the email (or only the link contained therein) along with its attributes, e.g., sender details, recipient details, e-mail content, URL (or URLs, when similar procedures as being elaborated hereunder can be performed on all the URLs), one or more time stamps representing a time at which a first check and/or subsequent checks are performed, metadata/hash value etc. of the file to which the URL points at the time of first check (and subsequent checks) etc. in a table in its database for further use, as elaborated herein. In another aspect, mail server 104 can store the URL as well as the recipient (email user 102) and the sender (email source 112) email addresses in a temporary cache.

Sandbox environment 106 can, based upon determination of the threat level of the file at the time of first check determine a course of action for the associated e-mail message. For example, when the threat level is below a pre-determined threshold, sandbox environment 106 can conclude that the file (as well as the associated e-mail message containing the URL that points to the file) is safe. Accordingly, sandbox environment 106 can allow the email client of intended recipient email user 102 to access the email from mail server 104 via network 110. In one embodiment, sandbox environment 106 can retain all the attributes of the email/file as elaborated above. When sandbox environment 106 determines the file is malicious, it can block/discard/quarantine the associated e-mail, thereby preventing intended recipient email user 102 from being exposed to the malicious email, while alerting relevant personnel, e.g. system administrator, recipient, and the sender as appropriate in accordance with the enterprise's security policies.

As mentioned above, sandbox environment 106 can be configured to check the URL again after a pre-determined time (i.e., at a second time). At this second time, it may or may not run/execute the file pointed to by the same URL for malware checks, but rather may simply determine identifying parameters associated with the file, e.g., a second hash value of the file pointed to by the URL at the second time, and accordingly compare the second hash value (i.e., the hash value of the file pointed to by the URL contained within the email at the second time) with the first hash value (i.e., the hash value of the file pointed to by the URL of the email at the first time). When the two hash values are the same, sandbox environment 106 can reasonably conclude that there has been no change in the file that the URL points to (e.g., a malware-infected file has not be substituted on the backend for an original benign file), and hence can keep the threat level and consequent procedures the same as elaborated above. However, if the second hash value is different from the first hash value, sandbox environment 106 can conclude that there has been a change in the file to which the URL points, or that the URL is now pointing to a different file, which indicates that this may be an attempt to inject malware into the protected network to which email users 102 are connected by employing a time delay based network attack. Responsive to detecting a difference between the first hash value and the second hash value, sandbox environment 106 and/or mail/email server 104 can take appropriate actions including, but not limited to, advising and warning the sender of the email, the recipient of the email and/or administrators of networks through which the email may have travelled, blacklisting the sender's email address, the sender's domain and/or the sender's mail server so that the protected network including mail servers, e.g. mail server 104 reject subsequent e-mails from the sender/domain of the sender. Similarly, sandbox environment 106 and/or mail server 104 can be configured to automatically send the IP address of SMTP server 114 to one or more publicly accessible or subscription-based IP-reputation blacklists (e.g. Realtime blacklist, Domain Name Service Block List (DNSBL) or Reaktune Blackhole List (RBL)) to make it more difficult for SMTP server 114 to attack third parties.

Those skilled in the art will appreciate that sandbox environment 106 can be configured to check the URL more than twice. For example, sandbox environment can check the URL as soon as it receives the e-mail, 10 minutes thereafter, 30 minutes thereafter and 50 minutes thereafter. In another exemplary embodiment, sandbox environment 106 can be configured to check the URL at random intervals over a fixed time period, say three hours and perform as above. In an alternate exemplary embodiment, the system of the present disclosure can be configured to release an email containing an embedded URL to its intended recipient only after three checks have been carried out over the course of an hour as elaborated above and the file pointed by the URL has been determined to be safe and remains so across all the checks. In yet another exemplary embodiment, the system of the present disclosure can download the file when the second hash value is different from the first hash value, run/execute the file against stringent malware checks and take further actions as elaborated above only if the threat level of the changed file is above a pre-determined threshold. All such variations are fully within the ambit of the present disclosure. In another instance, when the embedded URL is initially, at the first time, found to be legitimate and non-malware, the email containing the embedded URL may be forwarded to its intended recipient and subsequently (e.g., at random, periodic or predetermined configurable time intervals) when the embedded URL is reevaluated and results in a different hash value, the intended recipient along with other stakeholders/administrators may be immediately notified and the email may be blocked, quarantined and/or further more detailed analysis may be performed on the email. In this manner, time delay based network attacks can be very effectively protected against.

FIG. 1B illustrates another exemplary sandbox implementation architecture 150 for mitigation of time-delay based network attacks that seek to avoid detection by email security solutions employing sandboxing in accordance with an exemplary embodiment of the present disclosure.

In an aspect, the system of the present disclosure can be operatively connected to a sender device 152 (e.g. a mobile phone, tablet PC, smart phone, and other like devices) that can be configured to send an email containing a URL that points to a file, via Internet 154 addressed to client devices 162-1 and 162-2 that are part of a protected network 156.

The protected network 156 can further include a network controller/email server (which may be interchangeably referred to as mail server herein) 158 operatively in communication with a sandbox device 160 and client devices 162-1 and 162-2 (and similarly, any number of client devices, which may be collectively referred to as 162 hereinafter). Email server 158 can be configured to receive, through Internet 154, various emails directed/intended for client devices 162 connected to it and further send them or otherwise make them accessible to such client devices.

In an exemplary embodiment, sender device 152 may be deployed by a malware author for a time delay based network attack. For this purpose, sender device 152 may send an email 164 containing URL 166 addressed to client devices 162-1 and 162-2. Email 164 can be received by email server 158 that can detect that it contains a URL and can accordingly send email 164 to sandbox device 160 for further analysis. In one embodiment, only the URL may be sent to sandbox device 160. In another embodiment, only the file that the URL points to at a particular time may be sent to sandbox device 160.

As described above, sandbox device 160 can determine that at time t=0, URL 166 points to a file that is not malicious and has a threat level 0, for instance. Hence, sandbox device can release email 164 with URL 166 to network controller 158 that can accordingly pass it to client devices 162 or otherwise make it accessible to client devices 162. Those skilled in the art will appreciate that computation of a numerical threat level is completely exemplary in nature and is not mandatory in any respect, wherein sandbox device 160 can simply determine that the file pointed to by the URL of the email does not contain or indicate a virus/malware/threat, and hence may issue instructions to allow the email to be accessed by its intended recipient. It is also to be appreciated that the email may include multiple URLs, each of which may be processed with regards to files they respectively point to.

During its next check at t=10 minutes (for example), sandbox device 160 can detect that the URL 166 points to a different file or the content of the file has been changed by observing a difference in the hash values generated for the contents of the file to which the URL pointed to at t=0 and t=10. Accordingly, sandbox device 160 can trigger an alert 168 that can be sent to client devices 162 via network controller/email server 158.

Those skilled in the art will appreciate that mail server 158 can itself be configured to query sandbox device 160 periodically or at predetermined or configurable time frames and determine further actions accordingly. For example, email server 158 can keep email 164 and forward only URL 166 for analysis to sandbox device 160. In such a case, if email server 158 queries sandbox device 160 at a first time and gets an answer regarding a threat level of the file to which URL 166 points at the first time, and email server 158 queries sandbox device 160 again before sandbox device 160 has analyzed URL 166 a second time, sandbox device 160 can communicate to email server 158 the same status as indicated the first time. As such, those skilled in the art will appreciate the time interval between the first query issued by mail server 158 to sandbox device 160 and the second query issued by mail server 158 should be chosen to be long enough to allow sandbox device 160 to perform its second analysis in order that sandbox device 160 provides updated file analysis results, hash values etc. as required to email server 158 each time.

Figure 2:
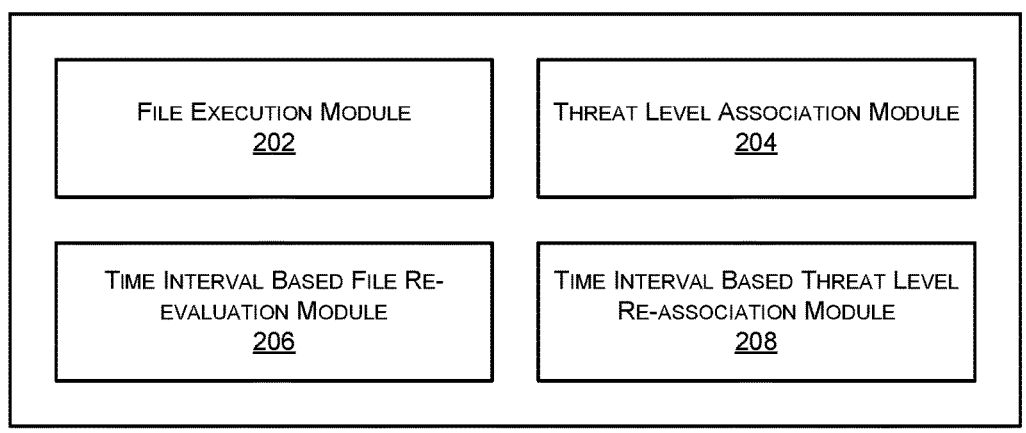
FIG. 2 illustrates an exemplary module diagram for detection and mitigation of time-delay based network attacks in accordance with an embodiment of the present invention.

FIG. 2 illustrates an exemplary module diagram for detection and mitigation of time-delay based network attacks in accordance with an embodiment the present invention.

In an aspect, various modules elaborated herein can be configured in a sandbox environment, e.g., sandbox system 200 illustrated so as to be completely isolated from the rest of the network/computer systems. Alternatively, a subset of one or more of the modules can be implemented in sandbox system 200 (which may also be referred to as sandbox environment 200 or sandbox device 200 or simply as sandbox hereinafter) and others can be implemented in email server/mail server or other elements of the proposed system architecture.

In an aspect, sandbox system 200 can be configured within a server, made available via the cloud, or can be configured as part of the mail server itself. Sandbox system 200 can be operatively configured to receive emails, or URLs within such emails, from different mail servers and to return to such mail servers, its results/verdict regarding file(s) to which the URL points at a particular time as described herein.

In another aspect, exemplary modules that can be configured in sandbox system 200 for detection and mitigation of time-delay based network attacks can include a file execution module 202, a threat level association module 204, a time interval based file re-evaluation module 206, and a time interval based threat level re-association module 208.

In an aspect, module 202 can be configured to receive, from an email server, an email containing a URL, or receive only the URL that has been extracted by the email server from the email at issue. The email may be directed to a mail server (recipient's mail server) that is part of a network being protected by the system of the present disclosure and the network itself can be part of an enterprise, and may have been sent by another mail server (sender's mail server) that may not be part of the protected network. In an exemplary embodiment, recipient's mail server may be configured to detect the existence of one or more URLs contained within the received email, and then forward a copy of the email to the module 202 while maintaining another copy itself for further actions as per instructions/verdict of the system of the present disclosure as described herein.

In another aspect, module 202 can instruct the recipient's mail server to withhold delivery of the email to the recipient until appropriate instructions from other modules of the proposed system have been received as described herein.

In an aspect, module 202 can store the email along with all or some subset of its attributes, e.g., sender details, recipient details, e-mail content, embedded URL(s), file(s) linked to by the embedded URL(s), and metadata of the file(s), in a database that can be operatively connected to various modules being described herein. Module 202 can compute, at a first time (for example, when the email/URL is initially received), a hash value of the file to which the URL points and store the hash value along with other attributes of the email in the database. In an aspect, the database can be a temporary cache that stores data until such time as a flush cache command is received by it. The file being presently pointed to by the URL can be referred to as a first file and its hash value can be referred to as a first hash value.

In another aspect, module 202 can download the first file to which the URL points and provide the first file to the threat level association module 204. In another exemplary implementation, the first file can be downloaded by the email server and then provided to the sandbox for computation of its content-based hash value.

In an aspect, threat level association module 204 can run/execute/analyze the first file against malware checks in its isolated (sandbox) environment to determine a threat level of the first file as per means known in the art, e.g., observing behaviors performed by the first file and/or comparing contents of the first file with latest virus/malware signatures etc. and associating a threat level with the first file based thereon. Other attributes of the first file may also be checked to evaluate whether the first file is safe/malware-free and if the email that comprises the URL that points to the first file can be forwarded or otherwise made available to the intended recipient.

In another aspect, if the threat level exceeds a pre-determined threshold value, module 204 can conclude that the URL points to a malicious/infected first file, and in such a case, module 204 can send an instruction/trigger to module 202 based upon which module 202 can instruct the recipient's mail server to prevent the mail from being delivered to the recipient. In an exemplary embodiment, module 202 can instead cause a network security device (NSD) to which it is operatively connected to similarly instruct the recipient's mail server. In another exemplary embodiment, module 202 can further quarantine the email for analysis by system administrators.

In yet another aspect, upon determination that the URL points to a malicious/infected first file, module 204 can immediately take appropriate further actions including, but not limited to, advising and warning sender and recipient of the e-mail and/or administrators of all the networks through which the email may have travelled, blacklisting the sender e-mail id/sender's domain/sender's mail server so that the protected network including mail servers, e.g., mail server 104 (recipient's mail server) reject any further e-mails from the sender/sender domain. Module 204 can be configured to automatically send mail server IP address of sender's mail server to one or more IP-reputation blacklists (e.g., Realtime blacklist, DNSBL and/or RBL) so that the mail server is not able to send malicious emails to other users as well. In an exemplary embodiment, module 204 can instead cause an NSD with which it is operatively connected, to take actions and raise alerts as being elaborated herein.

In another aspect, if the threat level associated with the first file is below the predetermined threshold value, module 204 can conclude that the first file does not represent a threat. In such a case, module 204 can send an instruction/trigger to module 202 based upon which module 202 can instruct the recipient's mail server to deliver the mail to the intended recipient. In an exemplary embodiment, module 204 can instead cause an NSD to which it is operatively connected, to similarly instruct the recipient's mail server.

It is to be appreciated that system of the present disclosure may not include module 204 during one of its exemplary implementations, and may only therefore, at a first time, compute the first hash value of the first file to which the embedded URL points and then, as described below, compare the first hash value with a second hash value of a second file (which may or may not have changed) that the same URL points to at a second time. Therefore, in such an implementation, a threat level may not need to be computed based on processing of the first file and instead the system may rely on a result of comparing the first hash value with the second hash value as an indicator of a time-delay based network attack.

In an aspect, time interval based file re-execution module 206 can re-evaluate, at a second time, the file pointed to by the URL contained in the email after a pre-determined or configurable time interval, wherein the file may be referred to as a second file herein. As explained above, in case of a time delay based network attack, the second file is typically a bad file that has been substituted for the first file.

In another aspect, the pre-determined time interval can be set by the user of the proposed system, or can be set automatically by the proposed system based upon evaluation of various factors. For example, if the sender's email server is "unknown" to the protected network, the time interval can be shorter, while if the email is from a "trusted" source/domain, it can be longer. Similarly, if the protected network has been repeatedly exposed to virus attacks in recent times, the pre-determined time interval can be shortened.

In an aspect, the time interval can be set to repeat a number of times. For example, module 206 can re-evaluate the file pointed to by the URL contained in the email every 10 minutes over the next 2 hours. The various time intervals can be random as well. For example, module 206 can be configured to re-evaluate the file pointed to by the URL contained in the email at least X times (e.g., 2, 5, or 10 times) at random time intervals over a Y hour (e.g., 1, 2 or more hour) period after receipt of the email, or every Z minutes (e.g., 10, 20 or 30 minutes) over the next Y hours. All such embodiments are intended to be encompassed by the present disclosure.

In another aspect, module 206 can compute the hash value of the second file using the same procedures and algorithms as employed by module 202 and this hash value can be referred to as the second hash value. Further, module 206 can compare the second hash value with the first hash value and when the second hash value is same as the first hash value, module 206 can determine that the second file that the URL points to after the pre-determined interval is the same as the first file, in which case, module 206 can stop any further processing of the email containing the URL since appropriate actions have already been taken by module 204 and module 202, as elaborated above. Module 206 can then be re-initiated after another defined/random time interval to re-compare the latest hash value with the first hash value. In yet another aspect, if the second hash value is not the same as the first hash value, module 206 can instruct module 208 to proceed further.

In an aspect, when the second hash value does not match the first hash value, threat level re-association module 208 can determine that the second file that the URL points to after the pre-determined interval is not the same as the first file. Since this condition is indicative of a time delay based network attack, module 208 can determine/conclude that the second file is a suspicious/high risk file and can take actions accordingly, associating a high threat level with the email/URL/second file.

In another aspect, upon determination that the protected network is under a time delay based network attack, module 208 can take appropriate further actions including, but not limited to, advising and warning sender and recipient of the e-mail as well as administrators of all the networks through which the email may have travelled, blacklisting the sender e-mail id/sender's domain/sender's mail server so that the protected network including mail servers e.g. mail server 104 (recipient's mail server) to reject any further e-mails from the sender/sender domain. Module 208 can be configured to automatically send mail server IP address of sender's mail server to any IP-reputation black-lists being maintained over the Internet (e.g. Realtime blacklist, DNSBL or RBL) so that the sender's mail server is not able to send malicious emails to other users as well. In an exemplary embodiment, module 208 can instead cause an NSD that it can be operatively connected with, to take such actions and raise such alerts as being elaborated herein.

As those skilled in the art will appreciate, in the context of the present example, determination of a time delay based network attack and consequently determination that the second file is likely infected/malicious/suspicious/high risk is based on a comparison of a hash value of the first file pointed to by the URL initially to that of the second file pointed to by the URL after a pre-determined interval. No further execution and analysis of either the first file or the second file may be required, although the first file can be analyzed in a sandbox environment to determine if it (and the email with the URL pointing to it) is suspicious/high risk to begin with. In this manner, determination of a time delay based network attack can be done without using a great deal of computing resources.

In yet another aspect, upon determination of a time delay based network attack as described above, module 208 can download and run/execute/analyze the second file against stringent malware checks in its isolated (sandbox) environment to determine the nature of the threat using means known in the art, e.g., comparing the contents of the second file with latest virus/malware signatures etc. This can enable the proposed system to undertake remedial actions depending upon the threat level of the second file, e.g., delivering anti-virus patches specifically targeted towards malware observed to be associated with time-delay based network attacks to recipient mail servers and computing devices so that they may be protected despite the end user making a mistake by clicking on the URL and downloading the second file.

In an exemplary embodiment, module 208 can instead cause an NSD to which it is operatively connected to take the remedial actions elaborated above.

Figure 3:
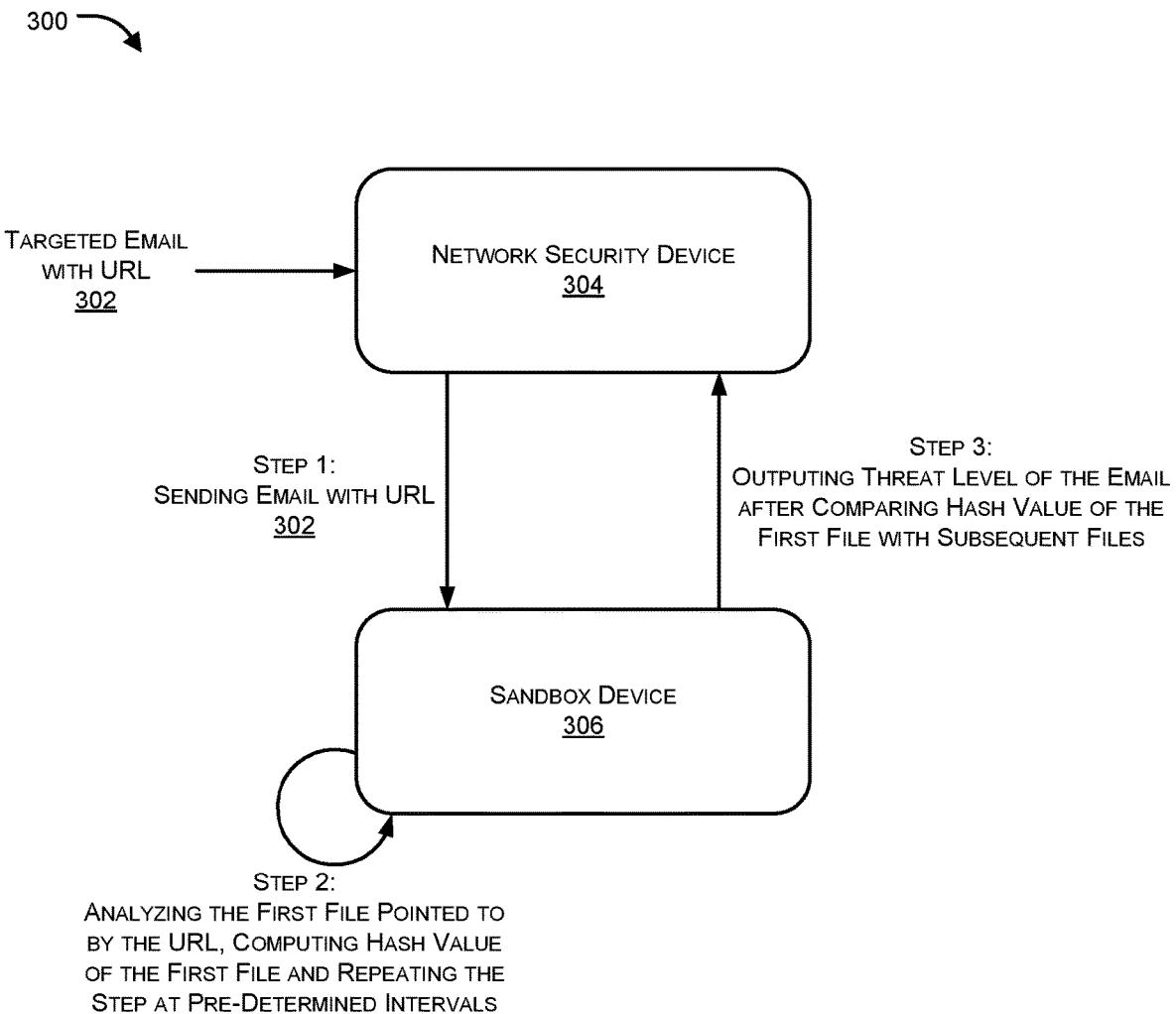
FIG. 3 is a block diagram illustrating how a sandbox associates a threat level with an email message or a URL contained therein, based on execution of file to which the URL points in accordance with an embodiment of present invention.

FIG. 3 is a block diagram illustrating how a sandbox associates a threat level with an email message or a URL contained therein, based on execution of file to which the URL points in accordance with an embodiment of present invention.

In an aspect, a sandbox device 306 is coupled in communication with a network security device (NSD) 304 that can receive various emails directed to various recipients associated with the network it is configured to protect, such a network being interchangeably referred to herein as a protected network.

In another aspect, NSD 304 can receive an email having an embedded URL 302 that links to a file, wherein the NSD 304 can, based on its configuration, send, at a first time, to sandbox device 306, the email, URL 302 or a file (after downloading) to which URL 302 points, as shown at step 1. In an exemplary embodiment, NSD 304 can maintain a copy of the email 302 and provide only URL 302 or the file linked thereto, to sandbox device 306, based on which sandbox device 306 can analyze the file at the first time and compute a hash value of the file based on its contents. This step can be repeated at different times (e.g., every 10, 20 or 30 minutes) to produce additional hash values of the file to which URL 302 points at such subsequent times to identify existence of a possible time-delay based network attack. For instance, at a second time, a hash value of the file pointed to by URL 302 can be computed based on content of the file, and the hash values computed at the first time and the second time (or subsequent time) can be compared. When the hash values computed at different times do not match, this is indicative of the content of the file having been changed or that the original file was replaced with a different file, responsive to which mail server, NSD 304 or sandbox device 306 may take appropriate actions, e.g., issue desired alerts, instructions, block delivery of the email to the intended recipient(s), sanitize the email, or otherwise block access to URL 302.

In an aspect, as shown in step 3, sandbox device 306, at each time it reevaluates the file, may also output a threat level associated with email 302 (or of the URL/file contained/linked therein) to NSD 304 after performing the hash value comparison (e.g., comparing the hash value of the first file with corresponding values of subsequent URL-linked files) as shown at step 3. Upon receipt of the threat level associated with email 302, NSD 304 can determine a further course of action to be taken with respect to email 302. In this manner, the proposed system can cause sandbox device 306 to repeat step 2 at pre-determined or random intervals by computing each time the hash value of the file that the URL points to after the pre-determined interval using the same algorithms and techniques, and compare the various second/subsequent hash values with the first hash value.

As discussed above, whenever the second or subsequent hash values differ from the first hash value, the proposed system can determine that a time-delay based network attack has been attempted/is underway. Upon such determination, the proposed system can raise alerts/take actions as elaborated above, or can cause NSD 304 to raise alerts/take actions elaborated above. Further, sandbox device 306 can analyze the second file in its sandbox environment to determine the nature of the threat and provide such data to the NSD 304 for further alerts and actions, e.g., distribution of antivirus patches etc. by NSD 304, as described above.

FIGS. 4A to 4D illustrate, using exemplary diagrams, how time-delay based network attacks can be detected by execution of file(s) pointed to by a URL contained in an email at an initial time and after a time interval and comparison of hash values obtained at these times in accordance with an embodiment of the present invention.

Figure 4A:
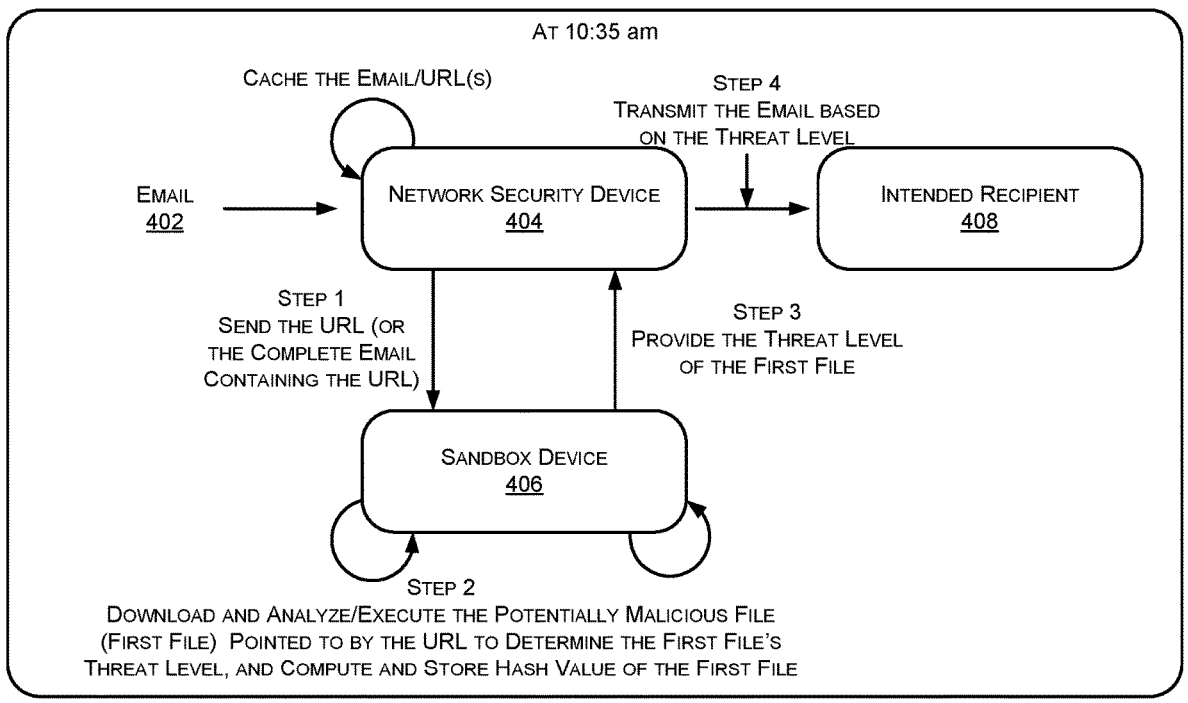
FIGS. 4A to 4D are block diagrams illustrating how time-delay based network attacks can be detected by execution of file(s) to which a URL contained in an e-mail points at an initial time and at a subsequent time and comparison of outputs obtained at these times in accordance with an embodiment of the present invention.

As illustrated in FIG. 4A, at 10:35 AM, a network security device 404 can receive an email 402 directed to intended recipient 408, wherein email 402 can contain a URL. NSD 404 can detect that email 402 contains the URL and can delay delivery of email 402 to recipient 408 and instead place email 402 in a temporary cache as illustrated. Further, NSD 404 can send the URL (or the complete email containing the URL) to a sandbox device 406 as illustrated at step 1.

In another aspect, sandbox device 406 can download and analyze/execute the potentially malicious file (which may also be referred to as the first file) pointed to by the URL to determine the first file's threat level, and can compute and store a hash value of the first file, such hash value may be referred to herein as the first hash value, as shown at step 2.

In yet another aspect, sandbox device 406 can provide the threat level of the first file to NSD 404, as illustrated at step 3, based on which, NSD 404 can transmit or otherwise make accessible email 402 to intended recipient 408 or can instead prevent access to email 402 by intended recipient 408.

Figure 4B:
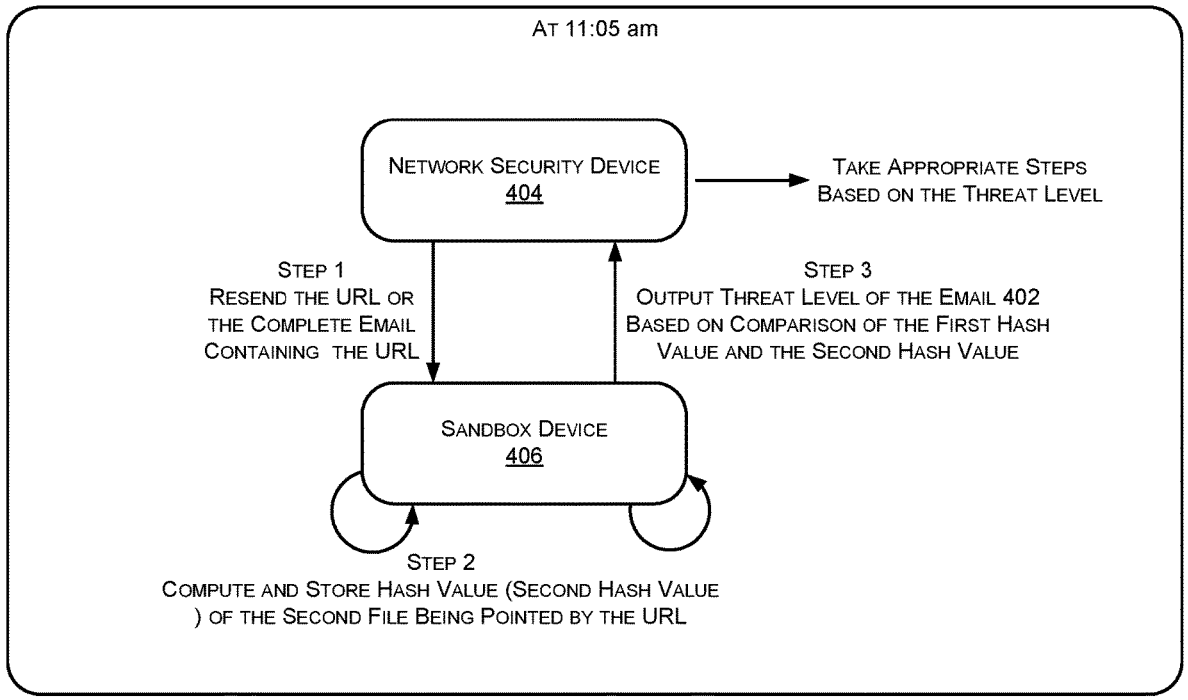

In an aspect, as illustrated in FIG. 4B, at 11:05 AM (i.e., 30 minutes after the receipt of email 402), NSD 404 can resend the URL (or the complete email containing the URL) that is already in its cache to sandbox 406 as illustrated at step 1. It should be appreciated that these are only exemplary implementations, and the URL may instead by retained by sandbox 406 and retested without being directed by NSD 404. In either event, sandbox device 406 can accordingly compute and store a hash value of a second file being pointed by the same URL at this time (11:05 AM in the present example), such hash value may be referred to herein as the second hash value, as shown at step 2. Sandbox device 406 can then output a threat level of email 402 based on a comparison of the first hash value (computed at the time of receipt of the email) with the second hash value (computed 30 minutes, for example, after computation of the first hash value) to NSD 404, as shown at step 3, based on which, NSD 404 can take appropriate steps. In an exemplary embodiment, when the first hash value and the second hash value are the same, sandbox device 406 can conclude that the second file (referenced by the URL at the later time) is the same as the first file and therefore can instruct NSD 404 to continue processing of email 402 (or not to take any action) based on the low perceived threat level associated with the first file. On the other hand, when the first hash value and the second hash value are different, sandbox device 406 can conclude that the second file is not the same as the first file and therefore, it can be presumed that a time-delay based network attack has been attempted, based on which sandbox device 406 can communicate accordingly to NSD 404, which can, in turn, take appropriate steps, e.g., raising alerts, blocking delivery of email 406 to the intended recipient(s), notifying the recipient, blocking the sender, etc. Further, sandbox device 406 can associate a high threat level with email 402, or with the URL, or with the second file for further use as appropriate.

It can be appreciated that in one embodiment determination of a time-delay based network attack may solely be done on the basis of comparison of the hash value of the first file pointed to by the URL initially to that of the second file pointed to by the URL after a pre-determined interval. No further execution and analysis of either the first file or the second file may be required, although the first file can optionally be analyzed in a sandbox environment to determine if it (and the email containing the URL pointing to it) is suspicious/high risk to begin with. In this manner, determination of a time-delay based network attack can be done without using a significant amount of computing resources.

In yet another aspect, upon determination of a time-delay based network attack as described above, sandbox device 406 can run/execute/analyze the second file against stringent malware checks in its isolated (sandbox) environment to determine the nature of the threat by means known in the art, e.g., observing the behavior of the second file in the sandbox environment under various stipulations and/or comparing the contents of the second file with latest virus/malware signatures etc. This can enable the proposed system to take quick remedial actions depending upon the threat level of the second file, e.g., delivering quickly anti-virus patches specifically targeted towards malware associated with the second file to recipient mail servers and computing devices in order to mitigate against potential damage should the second file be inadvertently downloaded.

Figure 4C:
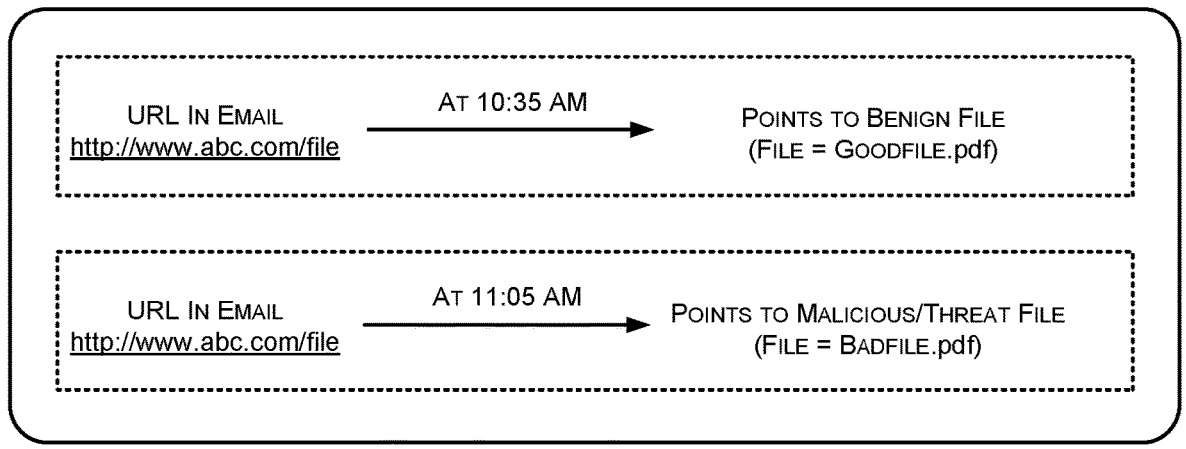

FIG. 4C illustrates how a time-delay based network attack can propagate. In an aspect, during a time-delay based network attack, a URL provided in an email in the form of a link, for example, can initially point to a good file (and thereby deceive the various defensive measures of the protected network into allowing the email to be delivered to its intended recipients), and after passage of some time, the good file may be replaced with a bad file so that the URL now points to the bad file. If, after the good file has been replaced with the bad file, an intended recipient selects the link, the bad file will be downloaded to his/her computer system and the malware associated with the bad file may be activated. In an exemplary embodiment, as illustrated by FIG. 4C, at 10:35 AM, the URL present in the email 402 (for example, http://www.abc.com/file) may point to a good file (e.g., goodfile.pdf), which is benign and therefore triggers no malware signatures when evaluated by NSD 404. At this time, sandbox device 406 uses the URL, http://www.abc.com/file, to download and run/execute/analyze the good file, computes and stores a hash value of the good file, determines that it is not a threat and accordingly allows NSD 404 to deliver email 402 to intended recipient 408. However, at some point thereafter, the good file is replaced by a bad file (e.g., badfile.pdf) or the content thereof as port of a time-delay based network attack. As such, the URL, http://www.abc.com/file, now points malicious content and will therefore trigger malware signatures if properly analyzed. If no further analysis of the URL is performed and intended recipient 408 interacts with the link, malware in the bad file can infect the computer system of intended recipient 408 and potentially propagate through the protected network. However, using the proposed system, at 11:05 AM, sandbox device 406 can use the URL, http://www.abc.com/file, to download and run/execute/analyze the bad file, compute a hash value of the bad file, determine that it represents a threat by comparing the newly generated hash value to the initially generated hash value, and accordingly direct NSD 404 to prevent delivery of email 402 to intended recipient 408. In this manner, the time-delay based network attack may be prevented.

Figure 4D:
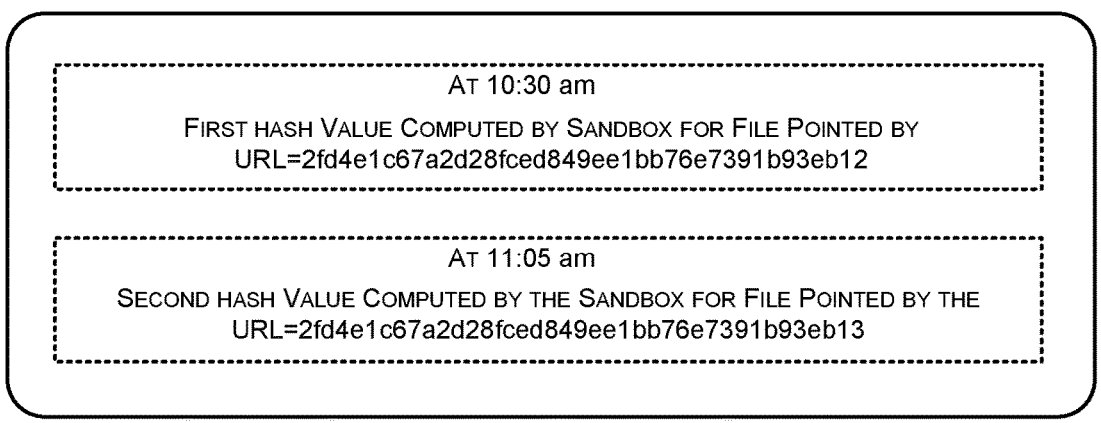

As illustrated by FIG. 4D, the proposed system can compute and compare hash values of the content of a file (e.g., the good file and the bad file) at different time frames so as to determine whether the content of the file, to which a URL embedded in an email points, has changed from the time at which the file was initially evaluated. As shown, at 10:30 AM, sandbox of the proposed system can compute a first hash value of a first file (e.g. a good file) linked by URL, http://www.abc.com/file. At 11:05 AM, sandbox of the proposed system can compute a second hash value of a second file (e.g., the bad file, which has replaced the good file or the content thereof) linked by the same URL, http://www.abc.com/file. By comparing the first hash value with the second hash value, the proposed system can determine whether a time-delay based network attack is underway, as elaborated above. In an exemplary embodiment, the proposed system can issue alerts to administrators of the protected network as well as various recipients of the email regarding the email possibly linking to malware. Those skilled in the art will appreciate that while specific times (e.g., 10:30 AM and 11:05 AM) are used for purposes of illustration in the examples described herein for generating hash values associated with a file to which a URL embedded within an email message points, other time delays are specifically contemplated herein as time-delay based network attacks may evolve or change over time. For example, at a particular time in the future, should empirical evidence reveal that time-delay based network attacks involve replacing the original benign content of a file with malicious content approximately X minutes after an email is sent containing a URL pointing to the file, then embodiments of the present invention may be implemented so as to allow a network administrator of the network security device, email server and/or sandbox device at issue to configure the timing of the second or subsequent evaluations to be performed at a time greater than X minutes after the initial file evaluation is performed.

Figure 5A:
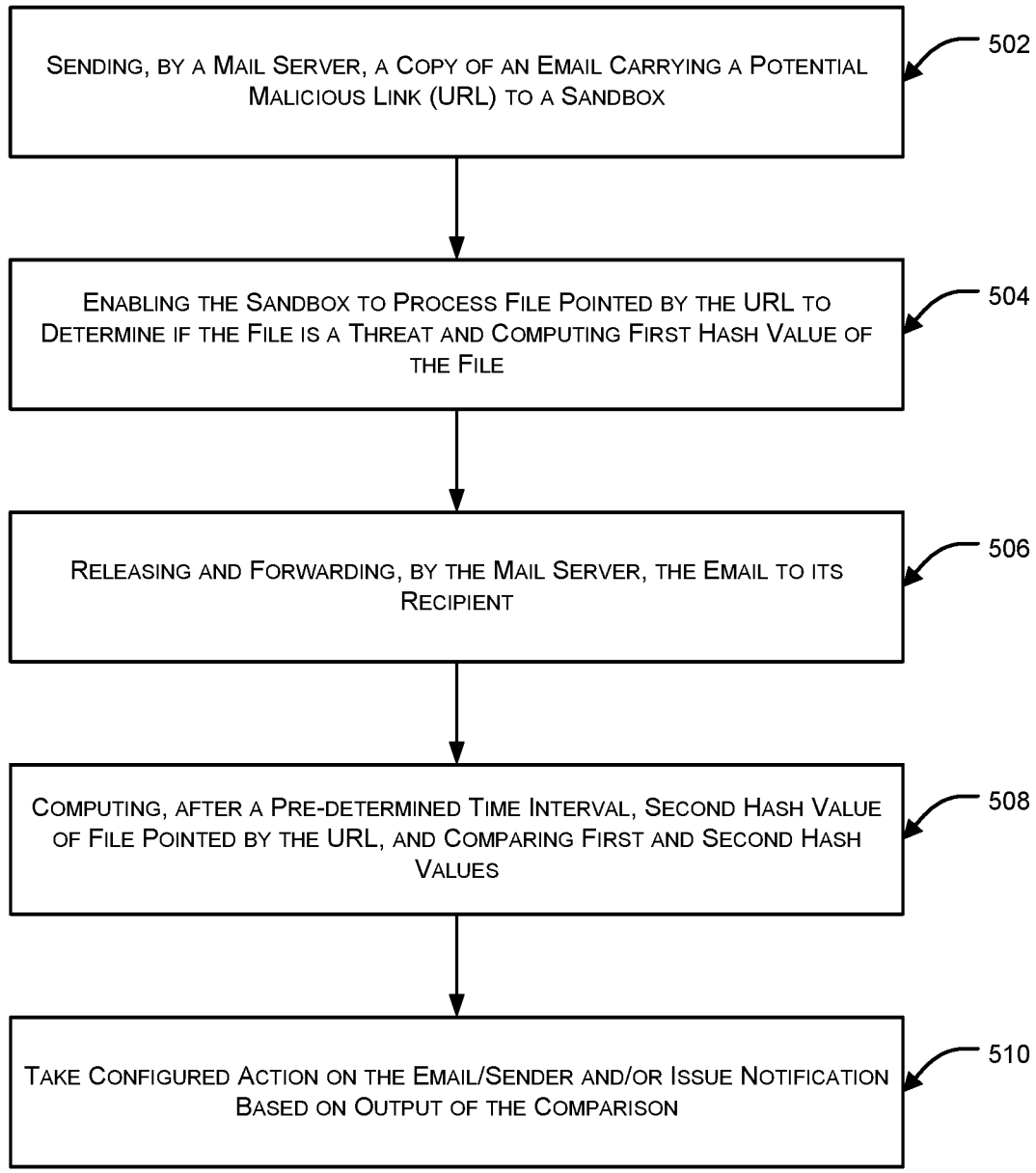
FIG. 5A is a flow diagram illustrating a method of detection and mitigation of time-delay based network attacks in accordance with an embodiment of the present invention.

FIG. 5A is a flow diagram illustrating a method of detection and mitigation of time-delay based network attacks in accordance with an embodiment of the present invention.

A method of detection and mitigation of a time delay based network attack (which may also be referred to as an URL-evasive technique) can include steps that can be executed in a mail server communicatively coupled with a sandbox, any or a combination of the two being configured with the system of the present disclosure.

In an aspect, step 502 can include sending, by a mail server, a copy of an email carrying a potential malicious link (e.g., a URL) to a sandbox, the mail server executing simultaneously a function of "submit and wait for result" before proceeding further with the email. The mail server can therefore submit the email to the sandbox and wait for a result from the sandbox before proceeding further. In this manner, the mail server can prevent the email from being delivered to its intended recipient until a result/verdict is returned from the sandbox. Step 504 can include downloading, by the sandbox, a file to which the URL contained in the email at issue currently points, running the file through sandbox process such that if the file is not deemed a threat based on the sandbox behavioral observations, for example, computing and caching a hash value (herein referred to as the first hash value) of the content of the file; and informing the mail server to release the email for delivery to its intended recipient. In an exemplary embodiment, the hash values referred to herein may be generated by a cryptographic hash function (e.g., a message-digest algorithm, such as MD6-256, a secure hash algorithm, such as secure hash algorithm 224 (SHA-224), SHA-256, SHA-384, SHA-512, or the like).

Step 506 can include releasing and forwarding by the mail server the email to the intended recipient and caching, in an exemplary implementation, the URL as well as the intended recipient and sender email addresses, and step 508 can include downloading, after a pre-determined time interval, by the sandbox, the file to which the URL references in the previously checked email and computing the hash value for the file (which may be referred to herein as the second hash value); and comparing the first hash value with the second hash value, such that, as mentioned in step 510, when the second hash value does not match the first hash value, the sandbox can treat the second file as suspicious/high risk or can re-run the possibly malicious second file in a sandbox environment so as to share necessary threat information with local connected devices and malware detection systems. The mail server can subsequently send out a warning email to the recipient about possible malware from the sender email address as well as the date/time when the email was forwarded by the mail server to the recipient, and send out a warning email to the administrator of the mail server/protected network with the same information.

Figure 5B:
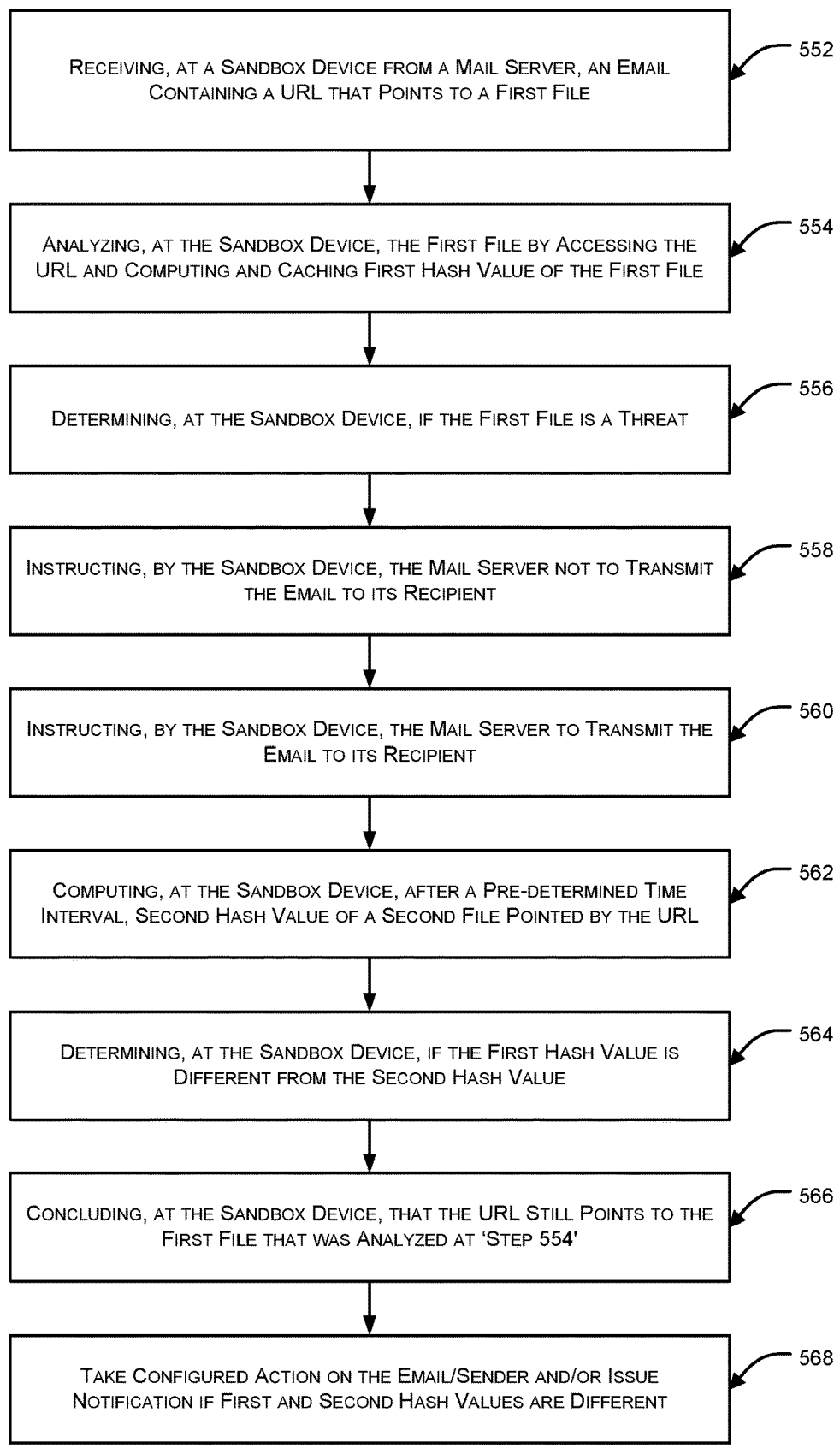
FIG. 5B is a flow diagram illustrating a method of detection and mitigation of time-delay based network attacks in accordance with another embodiment of the present invention.

FIG. 5B is a flow diagram illustrating a method of detection and mitigation of time-delay based network attacks in accordance with another embodiment of the present invention. The proposed method of detection and mitigation of a time delay based network attack can include steps that can be executed in an email server that is communicatively coupled with a sandbox, wherein any or a combination of the two are configured with the system of the present disclosure.

In an aspect, step 552 can include receiving, at a sandbox device, from a mail server, an email containing a URL that points to a first file, and the mail server delaying delivery of the email message to the intended recipient where the sandbox device, the mail server, and the recipient are part of a protected network. Step 554 can include analyzing, at the sandbox device, the first file by downloading the file associated with the URL and computing and caching a first hash value of the content of the first file, and step 556 can include determining, by the sandbox device, whether the first file is a threat. At step 558, the method can include instructing, by the sandbox device, the mail server not to transmit the email to the intended recipient if the first file is identified as a threat, and at step 560, instructing, by the sandbox device, the mail server to deliver the email to the intended recipient if the first file is not identified as a threat.

At step 562, the method can include the step of computing, by the sandbox device, after a pre-determined time interval, a second hash value of the file now associated with the URL (which possibly could be a different file than the first file or could be the same file but with different content). The file associated with the URL at the time of this subsequent evaluation is referred to herein as the second file. In any event, at step 564, it is determine, by the sandbox device, whether the first hash value is different from the second hash value, at step 566, concluding, by the sandbox device, that the URL still points to the first file that was analyzed in step 554 if the first hash value is not different from the second hash value, and at step 568, concluding, by the sandbox device, that the URL does not point now to the same file (or a file containing the same content) that was analyzed at step 554 by flagging the email message as a threat and taking appropriate action, including, but not limited to, alerting an administrator (or any other stakeholder) of the protected network regarding the identified threat.

Figure 6:
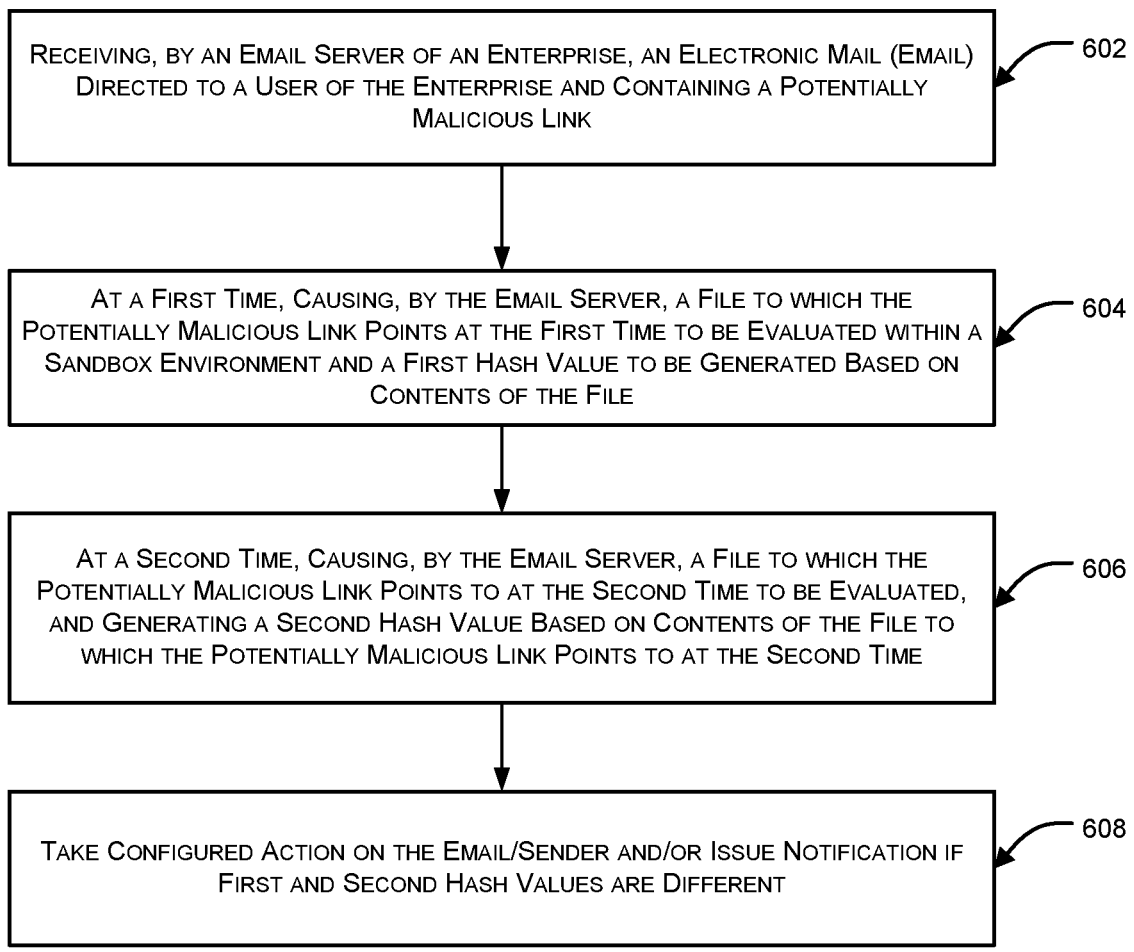
FIG. 6 is a flow diagram illustrating a method of detection and mitigation of time-delay based network attacks in accordance with yet another embodiment of the present invention.

FIG. 6 is a flow diagram illustrating a method of detection and mitigation of time-delay based network attacks in accordance with yet another embodiment of the present invention.

In an aspect, the method can include, at step 602, receiving, by an email server of an enterprise, an electronic mail (email) directed to a user of the enterprise and containing a potentially malicious link, and at step 604, at a first time, causing, by the email server, a file to which the potentially malicious link points at the first time to be evaluated within a sandbox environment and a first hash value to be generated based on contents of the file to which the potentially malicious link points at the first time. The method can include, at step 606, at a second time, causing, by the email server, a file to which the potentially malicious link points to at the second time to be evaluated, including downloading the file to which the potentially malicious link points to at the second time and generating a second hash value based on contents of the file to which the potentially malicious link points to at the second time. At step 608, when the first hash value and the second hash value differ, the method can include the step of either treating, by the email server, the file to which the potentially malicious link points to at the second time as a suspicious or high risk file or causing, by the email server, the file to which the potentially malicious link points to at the second time to be evaluated within the sandbox environment.

Figure 7:
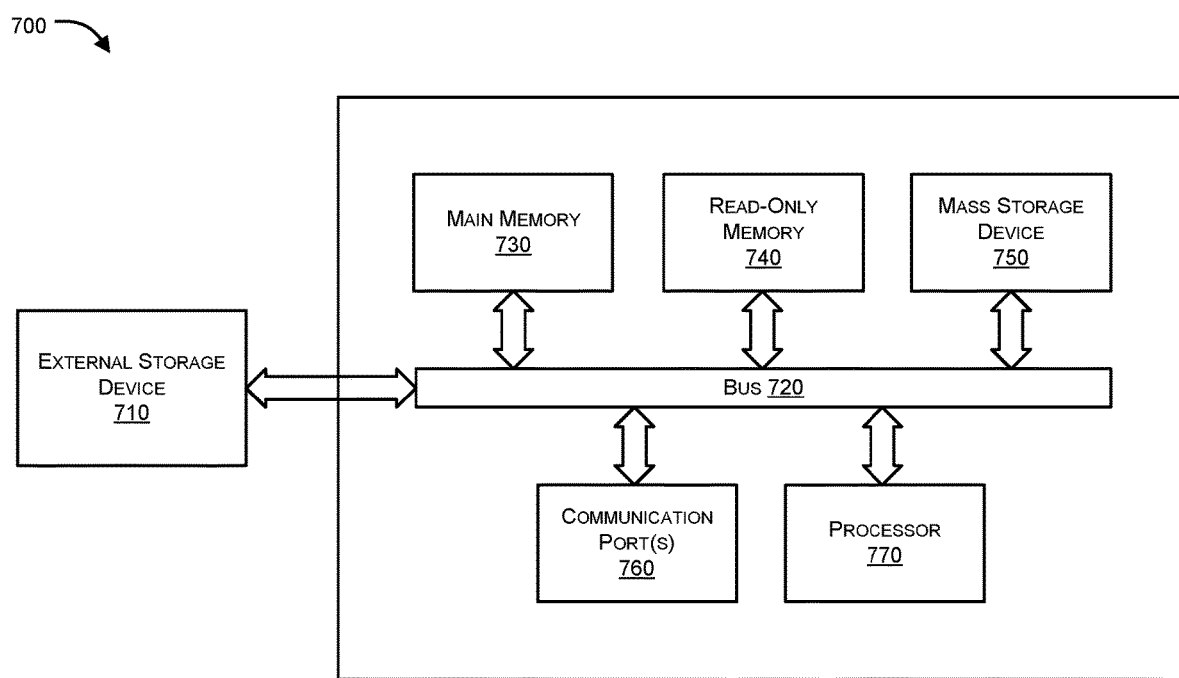
FIG. 7 illustrates an exemplary computer system in which or with which embodiments of the system of the present disclosure may be utilized.

FIG. 7 illustrates an exemplary computer system in which or with which embodiments of the system of the present disclosure may be utilized. The computer system may represent one or more aspects of a sandbox device (e.g., sandbox device 160, 200, 306, or 406 providing sandbox environment 106), a mail server (e.g., user mail server 104, SMTP server 114 or email server 158) or a network security device (e.g., network security device 304 or 404).

In an embodiment, computer system 700 can provide sandbox environment for detection and mitigation of time-delay based network attacks. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown in the figure, computer system 700 includes an external storage device 710, a bus 720, a main memory 730, a read only memory 740, a mass storage device 750, communication port 760, and a processor 770. A person skilled in the art will appreciate that computer system 700 may include more than one processor and communication ports.

Examples of processor 770 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 770 may include various modules associated with embodiments of the system of the present disclosure.

Communication port 760 can be any of an RS-232 port for use with a modem based dialup connection, a 10/100 Ethernet port, a Gigabit or 10 Gigabit port using copper or fiber, a serial port, a parallel port, or other existing or future ports. Communication port 760 may be chosen depending on a network, such a Local Area Network (LAN), Wide Area Network (WAN), or any network to which computer system 700 connects.

Memory 730 can be Random Access Memory (RAM), or any other dynamic storage device commonly known in the art. Read only memory 740 can be any static storage device(s) e.g., but not limited to, a Programmable Read Only Memory (PROM) chips for storing static information e.g., start-up or BIOS instructions for processor 770.

Mass storage 750 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc. Bus 720 communicatively couples processor(s) 770 with the other memory, storage and communication blocks.

Bus 720 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 770 to software system. Optionally, operator and administrative interfaces, e.g. a display, keyboard, and a cursor control device, may also be coupled to bus 720 to support direct operator interaction with computer system 700. Other operator and administrative interfaces can be provided through network connections connected through communication port 760.

External storage device 710 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM). Components described above are meant only to exemplify various possibilities. In no way should the aforementioned exemplary computer system limit the scope of the present disclosure.

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

If the specification states a component or feature "may", "can", "could", or "might" be included or have a characteristic, that particular component or feature is not required to be included or have the characteristic.

In an embodiment, emails received by email server of the enterprise can be checked for the possibility of a potentially malicious link in real-time, i.e., as soon as the email is received by the email server of the enterprise.

In another embodiment, the emails received by email server of the enterprise can be checked in batches for the possibility of potentially malicious links, i.e., only when the number of emails received by the email server of the enterprise exceed a predetermined or configurable threshold.

In an embodiment, emails received by email server of the enterprise can be checked for the possibility of a potentially malicious link at periodic intervals, which may or may not be customized by the user. In an exemplary implementation, emails received by email server of the enterprise can be checked for the possibility of a potentially malicious link every 10, 20 or 30 minutes over a period of time.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A method comprising:
   receiving from a computer system, by a processor of a sandbox device, a potentially malicious link associated with a communication; and
   subverting, by processor, a link evasion technique in which a first file to which the potentially malicious link points to at a first time is replaced with a second file on or before a second time by:
   downloading the first file at the first time;
   assigning a first threat level to the communication based on one or more of evaluating a behavior of the first file in a sandbox environment provided by the sandbox device and comparing contents of the first file with a plurality of malware signatures, wherein the first threat level is indicative of a lack of a perceived threat;
   generating a first hash value based on the contents of the first file;
   informing the computer system that the first threat level has been assigned to the communication;
   downloading the second file at the second time;
   generating a second hash value based on the contents of the second file;
   assigning a second threat level to the communication indicative of the communication representing a risk based on the second hash value differing from the first hash value; and
   informing the computer system that the second threat level has been assigned to the communication.

2. The method of claim 1, wherein the communication comprises an electronic mail (email).

3. The method of claim 2, wherein the potentially malicious link is contained within a body of the email.

4. The method of claim 2, wherein the potentially malicious link is contained within an attachment of the email.

5. The method of claim 2, wherein the computer system comprises a mail server.

6. The method of claim 2, further comprising blacklisting, by the sandbox device, an email address of a sender of the email, a domain of the sender, or a Simple Mail Transfer Protocol (SMTP) server from which the email was received.

7. The method of claim 6, wherein said blacklisting comprises causing, by the sandbox device, the SMTP server to be added to an Internet Protocol (IP)-reputation blacklist.

8. A sandbox device comprising:
a processor; and
a non-transitory computer-readable medium, coupled to the processor, having stored therein instructions that when executed by the processor cause the processor to:
receive from a computer system a potentially malicious link associated with a communication; and
subvert a link evasion technique in which a first file to which the potentially malicious link points to at a first time is replaced with a second file on or before a second time by:
downloading the first file at the first time;
assigning a first threat level to the communication based on one or more of evaluating a behavior of the first file in a sandbox environment within the sandbox device and comparing contents of the first file with a plurality of malware signatures, wherein the first threat level is indicative of a lack of a perceived threat;
generating a first hash value based on the contents of the first file;
informing the computer system that the first threat level has been assigned to the communication;
downloading the second file at the second time;
generating a second hash value based on the contents of the second file;
assigning a second threat level to the communication indicative of the communication representing a risk based on the second hash value differing from the first hash value; and
informing the computer system that the second threat level has been assigned to the communication.

9. The sandbox device of claim 8, wherein the communication comprises an electronic mail (email).

10. The sandbox device of claim 9, wherein the potentially malicious link is contained within a body of the email or within an attachment of the email.

11. The sandbox device of claim 9, wherein the computer system comprises a mail server or a network security device.

12. The sandbox device of claim 9, wherein the instructions further cause the processor to blacklist an email address of a sender of the email, a domain of the sender, or a Simple Mail Transfer Protocol (SMTP) server from which the email was received.

13. The sandbox device of claim 9, wherein the sandbox device is associated with a private network and wherein the instructions further cause the processor to share threat information associated with the email with one or more other network security devices associated with the private network.

14. A non-transitory machine readable medium storing instructions, which when executed by a processor of a sandbox device cause the processor to:
receive from a computer system a potentially malicious link associated with a communication; and
subvert a link evasion technique in which a first file to which the potentially malicious link points to at a first time is replaced with a second file on or before a second time by:
downloading the first file at the first time;
assigning a first threat level to the communication based on one or more of evaluating a behavior of the first file in a sandbox environment within the sandbox device and comparing contents of the first file with a plurality of malware signatures, wherein the first threat level is indicative of a lack of a perceived threat;
generating a first hash value based on the contents of the first file;
informing the computer system that the first threat level has been assigned to the communication;
downloading the second file at the second time;
generating a second hash value based on the contents of the second file;
assigning a second threat level to the communication indicative of the communication representing a risk based on the second hash value differing from the first hash value; and
informing the computer system that the second threat level has been assigned to the communication.

15. The non-transitory machine readable medium of claim 14, wherein the communication comprises an electronic mail (email).

16. The non-transitory machine readable medium of claim 15, wherein the potentially malicious link is contained within a body of the email or within an attachment of the email.

17. The non-transitory machine readable medium of claim 15, wherein the computer system comprises a mail server or a network security device.

18. The non-transitory machine readable medium of claim 15, wherein the instructions further cause the processor to blacklist an email address of a sender of the email, a domain of the sender, or a Simple Mail Transfer Protocol (SMTP) server from which the email was received.

19. The non-transitory machine readable medium of claim 15, wherein the sandbox device is associated with a private network and wherein the instructions further cause the processor to share threat information associated with the email with one or more other network security devices associated with the private network.

* * * * *